US010863172B2

(12) United States Patent
Yu et al.

(10) Patent No.: US 10,863,172 B2
(45) Date of Patent: Dec. 8, 2020

(54) INTRA MODE JVET CODING

(71) Applicant: ARRIS Enterprises LLC, Suwanee, GA (US)

(72) Inventors: Yue Yu, San Diego, CA (US); Limin Wang, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 82 days.

(21) Appl. No.: 16/043,845

(22) Filed: Jul. 24, 2018

(65) Prior Publication Data

US 2019/0028702 A1 Jan. 24, 2019

Related U.S. Application Data

(60) Provisional application No. 62/537,926, filed on Jul. 27, 2017, provisional application No. 62/536,072, filed on Jul. 24, 2017.

(51) Int. Cl.
| | |
|---|---|
| *H04N 19/11* | (2014.01) |
| *H04N 19/423* | (2014.01) |
| *H04N 19/169* | (2014.01) |
| *H04N 19/159* | (2014.01) |
| *H04N 19/13* | (2014.01) |
| *H04N 19/463* | (2014.01) |

(Continued)

(52) U.S. Cl.
CPC ............ *H04N 19/11* (2014.11); *H04N 19/13* (2014.11); *H04N 19/159* (2014.11); *H04N 19/176* (2014.11); *H04N 19/1887* (2014.11); *H04N 19/423* (2014.11); *H04N 19/463* (2014.11); *H04N 19/593* (2014.11)

(58) Field of Classification Search
None
See application file for complete search history.

(56) References Cited

U.S. PATENT DOCUMENTS

2017/0332084 A1* 11/2017 Seregin ............... H04N 19/159

FOREIGN PATENT DOCUMENTS

| EP | 2622864 A1 | 8/2013 |
|---|---|---|
| EP | 3379829 A1 | 9/2018 |
| WO | 2013/000324 A1 | 1/2013 |

(Continued)

OTHER PUBLICATIONS

Chen, Jianle, et al., Algorithm Description of Joint Exploration Test Model 5 (JEM 5), Joint Video Exploration Team (JVET) of ITU-T SG 16 WP 3 and ISO/IEC JCT 1/SC 29/WG 11, 5th Meeting: Geneva, CH, Jan. 12-20, 2017, Ouput Doc. No. JVET-E1001-v2 (Feb. 11, 2017) (Year: 2017).*

(Continued)

*Primary Examiner* — Lindsay J Uhl
(74) *Attorney, Agent, or Firm* — Chernoff, Vilhauer, McClung & Stenzel, LLP

(57) ABSTRACT

A method of partitioning a video coding block for JVET, wherein a set of MPMs includes a set of intra prediction coding modes and can be encoded using truncated unary binarization and selected intra prediction coding modes can be determined based upon addition and subtraction of increasing integer values from the set of MPM intra prediction coding modes and a set of non-selected intra prediction coding modes can be determined by addition and subtraction of the increasing integer values from the set of selected intra prediction coding modes.

20 Claims, 14 Drawing Sheets

(51) Int. Cl.
*H04N 19/593* (2014.01)
*H04N 19/176* (2014.01)

(56) References Cited

FOREIGN PATENT DOCUMENTS

WO 2017/086746 A1 5/2017
WO 2018/067714 A1 4/2018

OTHER PUBLICATIONS

Seregin, V. et al., Block shape dependent intra mode coding, Joint Video Exploration Team (JVET) of ITU-T SG 16 WP 3 and ISO/IEC JCT 1/SC 29/WG 11, 4th Meeting: Chengdu, CN, Oct. 15-21, 2016, Input Doc. No. JVET-D0114r1 (Oct. 14, 2016) (Year: 2016).*

Chen, Jianle, et al., "Algorithm Description of Joint Exploration Test Model 5 (JEM 5)", Joint Video Exploration Team (JVET) of ITU-T SG16 WP3 and ISO/IEC JCT1/SC29/WG11, 5th Meeting: Geneva, CH, Jan. 12-20, 2017, Output Doc. No. JVET-E1001-v2 (Feb. 11, 2017) (Year: 2017).*

J. Chen, et al., "Algorithm Description of Joint Exploration Test Model 6 (JEM 6)", JVET-F1001, 6th JVET Meeting, Hobart, AU, Apr. 2017.

Y.H. Jicheng, et al., "Improvements for Intra Prediction Mode Coding,", JVET-G0060, 7th JVET Meeting, Torino, IT, Jul. 2017.

PCT International Search Report & Written Opinion, Re: Application No. PCT/US2018/043438, dated Oct. 8, 2018.

V. Seregin, et al., "Block shape dependent intra mode coding," JVET-G0159, 7th JVET Meeting, Torino, IT, Jul. 2017.

PCT Search Report & Written Opinion, Re: Application No. PCT/US2018/043453, dated Oct. 8, 2018.

Arris, "Non-EE1: Priority List Based Intra Mode Coding with 5 MPM", 8th JVET Meeting (The Joint Video Exploration Team of ISO/IEC JTC1/SC29/WG11 and ITU-T SG.16) No. JVET-H0051-v2, Oct. 16, 2017.

J. Chen, et al., "Algorithm Description of Joint Exploration Test Model 5", 5th JVET Meeting (The Joint Video Exploration Team of ISO/IEC JTC1/SC29/WG11 and ITU-T SG.16) No. JVET-E1001-v2, Feb. 11, 2017.

V. Seregin, et al., "Block Shape Dependent Intra Mode Coding", 4th JVET Meeting, (The Joint Video Exploration Team of ISO/IEC JTC1/SC29/WG11 and ITU-T SG.16) No. JVET-D0114-v3, Oct. 15, 2016.

* cited by examiner

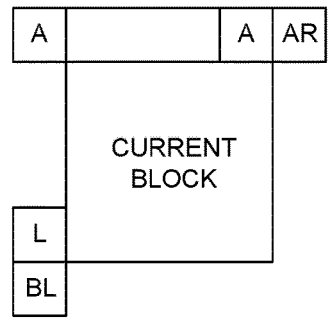
(PRIOR ART)
FIG. 1a
| INTRA PREDICTION MODES | MPM FLAG | SELECTED FLAG | BIN STRING |
|---|---|---|---|
| MPM MODES (6) | 1 | | 0 |
| | | | 10 |
| | | | 110 |
| | | | 1110 |
| | | | 11110 |
| | | | 11111 |
| SELECTED MODES (16) | 0 | 1 | 4 BITS FIXED LENGTH CODE |
| NON-SELECTED MODES (45) | 0 | 0 | TRUNCATED BINARY CODE |
(PRIOR ART)
FIG. 1b
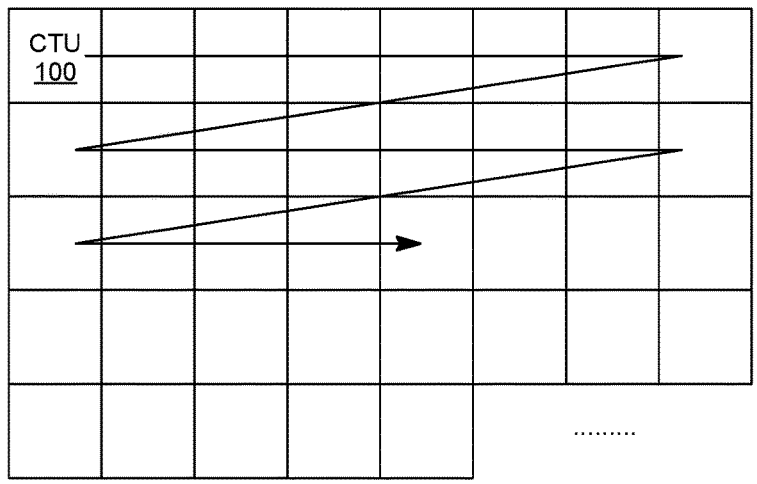
FIG. 1c Asymmetric Partitioning Type 1

Asymmetric Partitioning Type 2

Asymmetric Partitioning Type 3

Asymmetric Partitioning Type 4

| Intra prediction modes | MPM flag | Selected flag | Bin string |
|---|---|---|---|
| MPM modes (5) | 1 | | 0 |
| | | | 10 |
| | | | 110 |
| | | | 1110 |
| | | | 1111 |
| Selected modes (16) | 0 | 1 | 4 bits fixed length code |
| Non-selected modes (46) | 0 | 0 | Truncated binary code | ns is not
INTRA MODE JVET CODING

CLAIM OF PRIORITY

This Application claims priority under 35 U.S.C. § 119(e) from earlier filed U.S. Provisional Application Ser. No. 62/536,072, filed Jul. 24, 2017, and U.S. Provisional Application Ser. No. 62/537,926, filed Jul. 27, 2017 the complete contents of each of which is hereby incorporated herein by reference.

TECHNICAL FIELD

The present disclosure relates to the field of video coding and more specifically efficient intra mode coding.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

There are a total of 67 intra prediction modes described in the current JVET standard, including planar, DC modes and 65 directional angular intra modes. In order to efficiently code these 67 modes, all intra modes are subdivided into three sets, including the 6 most probable modes (MPMs) set, a 16 selected modes set and a 45 non-selected modes set.

The 6 MPMs are derived from modes of available neighbor blocks, derived intra modes and default intra modes. The intra modes of 5 neighboring blocks for a current block are depicted in FIG. 1a. They are left (L), above (A), below-left (BL), above-right (AR), and above-left (AL), and they are used to form the MPM list for the current block. An initial MPM list is formed by inserting 5 neighbor intra modes and the planar and DC modes into the MPM list. A pruning process is used to remove the duplicated modes so that only unique modes can be included into the MPM list. The order in which the initial modes are included is: left, above, planar, DC, below-left, above-right, and then above-left.

If the MPM list is not full, derived modes are added; these intra modes are obtained by adding −1 or +1 to the angular modes that are already included in the MPM list. If the MPM list is still not complete, the default modes are added in the following order: vertical, horizontal, mode 2, and diagonal mode. As a result of this process, a unique list of 6 MPM modes is generated.

For entropy coding of the 6 MPMs, a truncated unary binarization shown in the FIG. 1b is currently used. The first three bins of an MPM mode are coded with contexts that depend on the MPM mode related to the bin currently being signaled. The MPM mode is classified into one of three categories: (a) modes that are predominantly horizontal (i.e., the MPM mode number is less than or equal to the mode number for the diagonal direction), (b) modes that are predominantly vertical (i.e., the MPM mode is greater than the mode number for the diagonal direction), and (c) the non-angular (DC and planar) class. Accordingly, three contexts are used to signal the MPM index based on this classification.

The coding for the selection of the remaining 61 non-MPMs is done as follows. The 61 non-MPMs are first divided into two sets: a selected modes set and a non-selected modes set. The selected modes set contains 16 modes and the rest (45 modes) are assigned to the non-selected modes set. The mode set that the current mode belongs to is indicated in the bitstream with a flag. If the mode to be indicated is within the selected modes set, the selected mode is signaled with a 4-bit fixed-length code, and if the mode to be indicated is from the non-selected set, the selected mode is signaled with a truncated binary code. By way of example, the selected modes set is generated by sub-sampling the 61 non-MPM modes as follows:

Selected modes set={0, 4, 8, 12, 16, 20 . . . 60}
Non-selected modes set={1, 2, 3, 5, 6, 7, 9, 10 . . . 59}

Current JVET intra mode coding is summarized in the following FIG. 1b.

As seen in FIG. 1b, the last two entries of MPM list require six bins, which is the same number of bins assigned for the 16 selected modes. Such a design has no advantage in terms of coding performance for the last two modes on the MPM list. Also, since the first three bins of MPM modes are coded with context-based entropy coding, the complexity for coding six bins of MPM modes is higher than for coding six bins of selected modes.

What is needed is a system and method for reducing the coding burden and bandwidth associated with intra mode coding.

SUMMARY

The present disclosure provides a method of prioritizing intra prediction coding modes for JVET intra prediction coding, comprising steps to define a set of unique intra prediction coding modes and identify and instantiate in memory a subset of unique MPM intra prediction coding modes from said set of unique intra prediction coding modes. The method can further comprise steps of determining and instantiating in memory a subset of unique selected intra prediction coding modes from said set of unique intra prediction coding modes other than said subset of unique MPM intra prediction coding modes based on addition and subtraction of an increasing integer value from each of the unique MPM intra prediction coding modes and identifying and instantiating in memory a subset of unique non-selected intra prediction coding modes from said set of unique intra prediction coding modes other than said subset of unique MPM intra prediction coding modes and other than said subset of unique selected intra prediction coding modes.

The present disclosure also provides a system of prioritizing intra prediction coding modes for JVET intra prediction coding comprising steps of instantiating in memory a set of 67 unique intra prediction coding modes and instantiating in memory a subset of unique MPM intra prediction coding modes from said set of unique intra prediction coding modes. The system can further comprise steps for instantiating in memory a subset of 16 unique selected intra prediction coding modes from said set of unique intra prediction coding modes other than said subset of unique MPM intra prediction coding modes based on addition and subtraction of an increasing integer value from each of the unique MPM intra prediction coding modes, instantiating in memory a subset of unique non-selected intra prediction coding modes from said set of unique intra prediction coding modes other than said subset of unique MPM intra prediction coding modes and other than said subset of unique selected intra prediction coding modes, and encoding said subset of unique MPM intra prediction coding modes using truncated unary binarization. Additionally, the system can encode said subset of 16 unique selected intra prediction coding modes using 4 bits of fixed length code.

BRIEF DESCRIPTION OF THE DRAWINGS

Further details of the present invention are explained with the help of the attached drawings in which:

FIG. 1a depicts a current coding block and associated neighboring blocks

FIG. 1b depicts a table of current JVET coding for intra mode prediction.

FIG. 1c depicts division of a frame into a plurality of Coding Tree Units (CTUs).

DETAILED DESCRIPTION

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2:
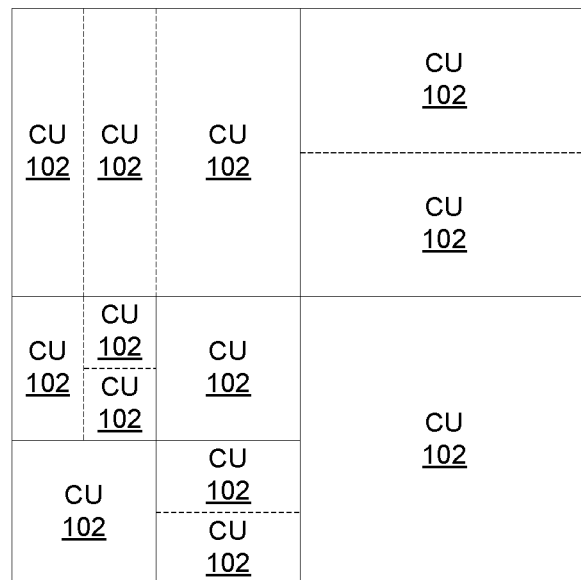
FIG. 2 depicts an exemplary partitioning of a CTU into Coding Units (CUs) using quadtree partitioning and symmetric binary partitioning.

FIG. 2 depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

In some embodiments JVET can limit binary partitioning in the binary tree portion of a QTBT to symmetric partitioning, in which blocks can be divided in half either vertically or horizontally along a midline.

By way of a non-limiting example, FIG. 2 shows a CTU 100 partitioned into CUs 102, with solid lines indicating quadtree splitting and dashed lines indicating symmetric binary tree splitting. As illustrated, the binary splitting allows symmetric horizontal splitting and vertical splitting to define the structure of the CTU and its subdivision into CUs.

Figure 3:
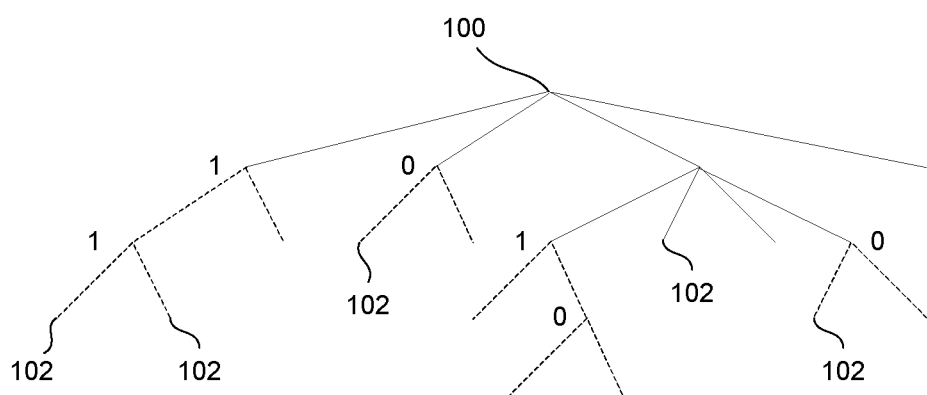
FIG. 3 depicts a quadtree plus binary tree (QTBT) representation of FIG. 2's partitioning.

FIG. 3 shows a QTBT representation of FIG. 2's partitioning. A quadtree root node represents the CTU 100, with each child node in the quadtree portion representing one of four square blocks split from a parent square block. The square blocks represented by the quadtree leaf nodes can then be divided symmetrically zero or more times using binary trees, with the quadtree leaf nodes being root nodes of the binary trees. At each level of the binary tree portion, a block can be divided symmetrically, either vertically or horizontally. A flag set to "0" indicates that the block is symmetrically split horizontally, while a flag set to "1" indicates that the block is symmetrically split vertically.

In other embodiments JVET can allow either symmetric binary partitioning or asymmetric binary partitioning in the binary tree portion of a QTBT. Asymmetrical motion partitioning (AMP) was allowed in a different context in HEVC when partitioning prediction units (PUs). However, for partitioning CUs 102 in JVET according to a QTBT structure, asymmetric binary partitioning can lead to improved partitioning relative to symmetric binary partitioning when correlated areas of a CU 102 are not positioned on either side of a midline running through the center of the CU 102. By way of a non-limiting example, when a CU 102 depicts one object proximate to the CU's center and another object at the side of the CU 102, the CU 102 can be asymmetrically partitioned to put each object in separate smaller CUs 102 of different sizes.

Figure 4:
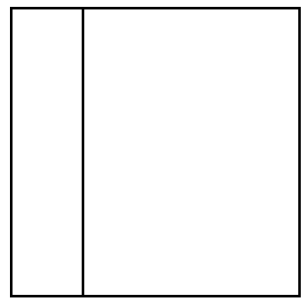
FIG. 4 depicts four possible types of asymmetric binary partitioning of a CU into two smaller CUs.
Figure 4:
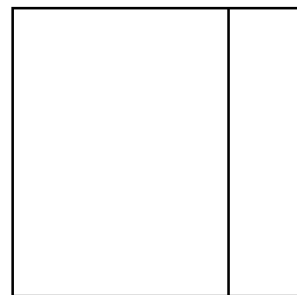
Figure 4:
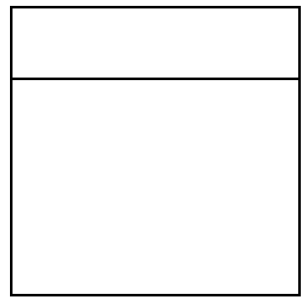
Figure 4:

FIG. 4 depicts four possible types of asymmetric binary partitioning in which a CU 102 is split into two smaller CU 102 along a line running across the length or height of the CU 102, such that one of the smaller CUs 102 is 25% of the size of the parent CU 102 and the other is 75% of the size of the parent CU 102. The four types of asymmetric binary partitioning shown in FIG. 4 allow a CU 102 to be split along a line 25% of the way from the left side of the CU 102, 25% of the way from the right side of the CU 102, 25% of the way from the top of the CU 102, or 25% of the way from the bottom of the CU 102. In alternate embodiments an asymmetric partitioning line at which a CU 102 is split can be positioned at any other position such the CU 102 is not divided symmetrically in half.

Figure 5:
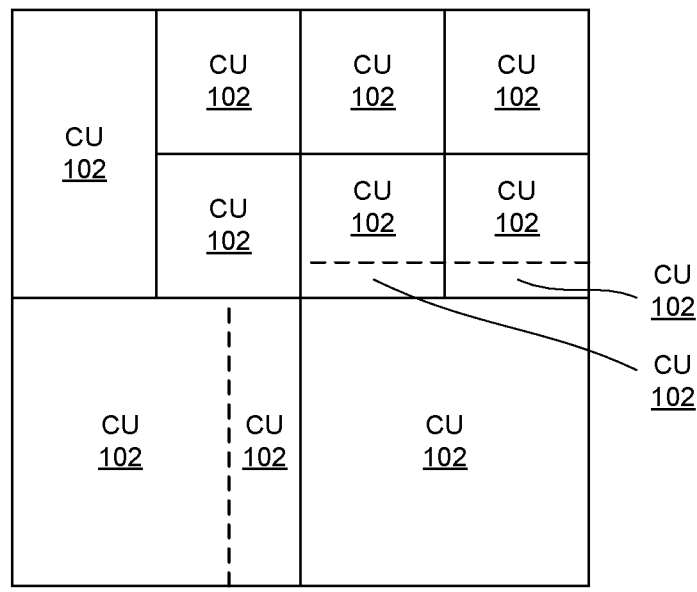
FIG. 5 depicts an exemplary partitioning of a CTU into CUs using quadtree partitioning, symmetric binary partitioning, and asymmetric binary partitioning.

FIG. 5 depicts a non-limiting example of a CTU 100 partitioned into CUs 102 using a scheme that allows both symmetric binary partitioning and asymmetric binary partitioning in the binary tree portion of a QTBT. In FIG. 5, dashed lines show asymmetric binary partitioning lines, in which a parent CU 102 was split using one of the partitioning types shown in FIG. 4.

Figure 6:
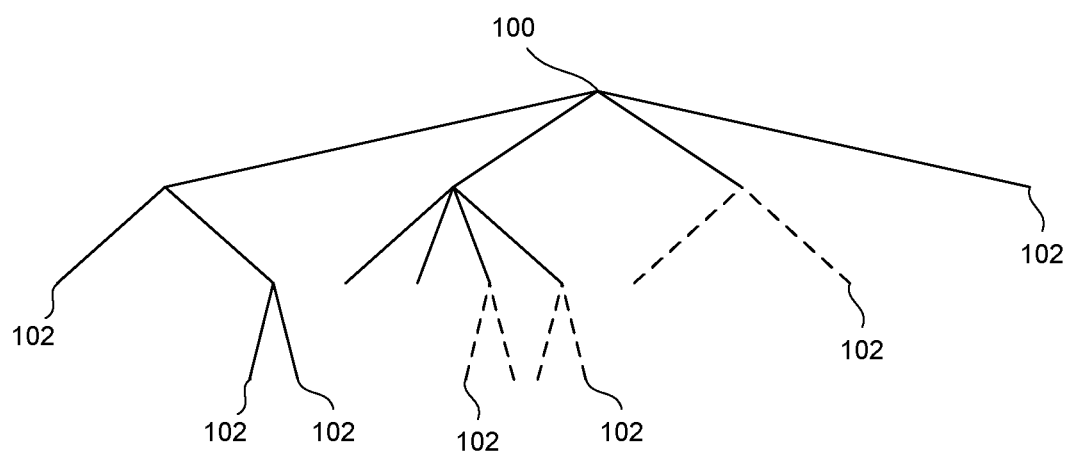
FIG. 6 depicts a QTBT representation of FIG. 5's partitioning.

FIG. 6 shows a QTBT representation of FIG. 5's partitioning. In FIG. 6, two solid lines extending from a node indicates symmetric partitioning in the binary tree portion of a QTBT, while two dashed lines extending from a node indicates asymmetric partitioning in the binary tree portion.

Syntax can be coded in the bitstream that indicates how a CTU 100 was partitioned into CUs 102. By way of a non-limiting example, syntax can be coded in the bitstream that indicates which nodes were split with quadtree partitioning, which were split with symmetric binary partitioning, and which were split with asymmetric binary partitioning. Similarly, syntax can be coded in the bitstream for nodes split with asymmetric binary partitioning that indicates which type of asymmetric binary partitioning was used, such as one of the four types shown in FIG. 4.

In some embodiments the use of asymmetric partitioning can be limited to splitting CUs 102 at the leaf nodes of the quadtree portion of a QTBT. In these embodiments, CUs 102 at child nodes that were split from a parent node using quadtree partitioning in the quadtree portion can be final CUs 102, or they can be further split using quadtree partitioning, symmetric binary partitioning, or asymmetric binary partitioning. Child nodes in the binary tree portion that were split using symmetric binary partitioning can be final CUs 102, or they can be further split recursively one or more times using symmetric binary partitioning only. Child nodes in the binary tree portion that were split from a QT leaf node using asymmetric binary partitioning can be final CUs 102, with no further splitting permitted.

In these embodiments, limiting the use of asymmetric partitioning to splitting quadtree leaf nodes can reduce search complexity and/or limit overhead bits. Because only quadtree leaf nodes can be split with asymmetric partitioning, the use of asymmetric partitioning can directly indicate the end of a branch of the QT portion without other syntax or further signaling. Similarly, because asymmetrically partitioned nodes cannot be split further, the use of asymmetric partitioning on a node can also directly indicate that its asymmetrically partitioned child nodes are final CUs 102 without other syntax or further signaling.

In alternate embodiments, such as when limiting search complexity and/or limiting the number of overhead bits is less of a concern, asymmetric partitioning can be used to split nodes generated with quadtree partitioning, symmetric binary partitioning, and/or asymmetric binary partitioning.

After quadtree splitting and binary tree splitting using either QTBT structure described above, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

In alternate embodiments JVET can use a two-level coding block structure as an alternative to, or extension of, the QTBT partitioning described above. In the two-level coding block structure, a CTU 100 can first be partitioned at a high level into base units (BUs). The BUs can then be partitioned at a low level into operating units (OUs).

In embodiments employing the two-level coding block structure, at the high level a CTU 100 can be partitioned into BUs according to one of the QTBT structures described above, or according to a quadtree (QT) structure such as the one used in HEVC in which blocks can only be split into four equally sized sub-blocks. By way of a non-limiting example, a CTU 102 can be partitioned into BUs according to the QTBT structure described above with respect to FIGS. 5-6, such that leaf nodes in the quadtree portion can be split using quadtree partitioning, symmetric binary partitioning, or asymmetric binary partitioning. In this example, the final leaf nodes of the QTBT can be BUs instead of CUs.

At the lower level in the two-level coding block structure, each BU partitioned from the CTU 100 can be further partitioned into one or more OUs. In some embodiments, when the BU is square, it can be split into OUs using quadtree partitioning or binary partitioning, such as symmetric or asymmetric binary partitioning. However, when the BU is not square, it can be split into OUs using binary partitioning only. Limiting the type of partitioning that can be used for non-square BUs can limit the number of bits used to signal the type of partitioning used to generate BUs.

Although the discussion below describes coding CUs 102, BUs and OUs can be coded instead of CUs 102 in embodiments that use the two-level coding block structure. By way of a non-limiting examples, BUs can be used for higher level coding operations such as intra prediction or inter prediction, while the smaller OUs can be used for lower level coding operations such as transforms and generating transform coefficients. Accordingly, syntax for be coded for BUs that indicate whether they are coded with intra prediction or inter prediction, or information identifying particular intra prediction modes or motion vectors used to code the BUs. Similarly, syntax for OUs can identify particular transform operations or quantized transform coefficients used to code the OUs.

Figure 7:
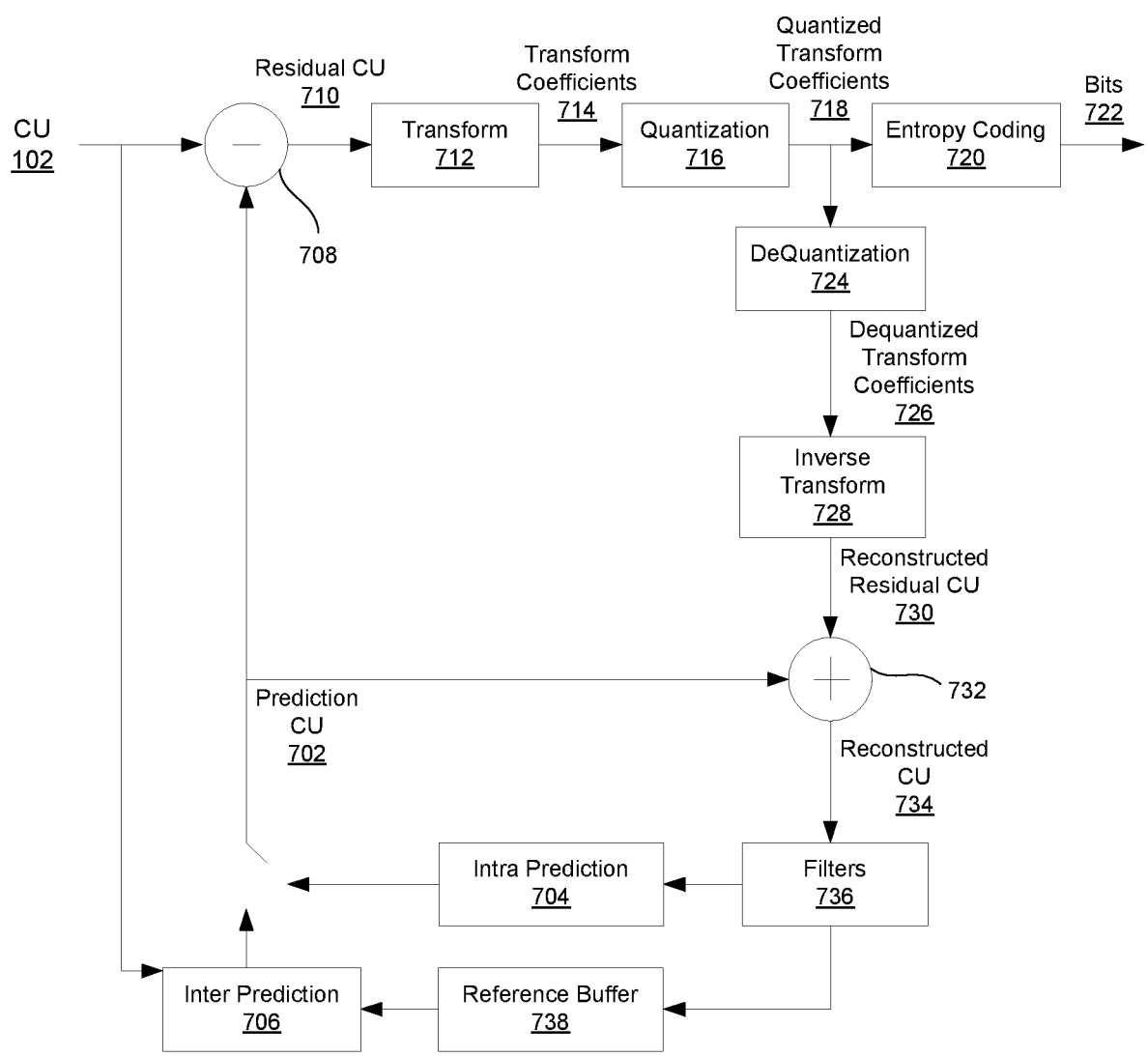
FIG. 7 depicts a simplified block diagram for CU coding in a JVET encoder.

FIG. 7 depicts a simplified block diagram for CU coding in a JVET encoder. The main stages of video coding include partitioning to identify CUs 102 as described above, followed by encoding CUs 102 using prediction at 704 or 706, generation of a residual CU 710 at 708, transformation at 712, quantization at 716, and entropy coding at 720. The encoder and encoding process illustrated in FIG. 7 also includes a decoding process that is described in more detail below.

Given a current CU 102, the encoder can obtain a prediction CU 702 either spatially using intra prediction at 704 or temporally using inter prediction at 706. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs 102 can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 734 from previously coded CUs 102, such as neighboring CUs 102 or CUs 102 in reference pictures.

When a CU 102 is coded spatially with intra prediction at 704, an intra prediction mode can be found that best predicts pixel values of the CU 102 based on samples from neighboring CUs 102 in the picture.

Figure 8:
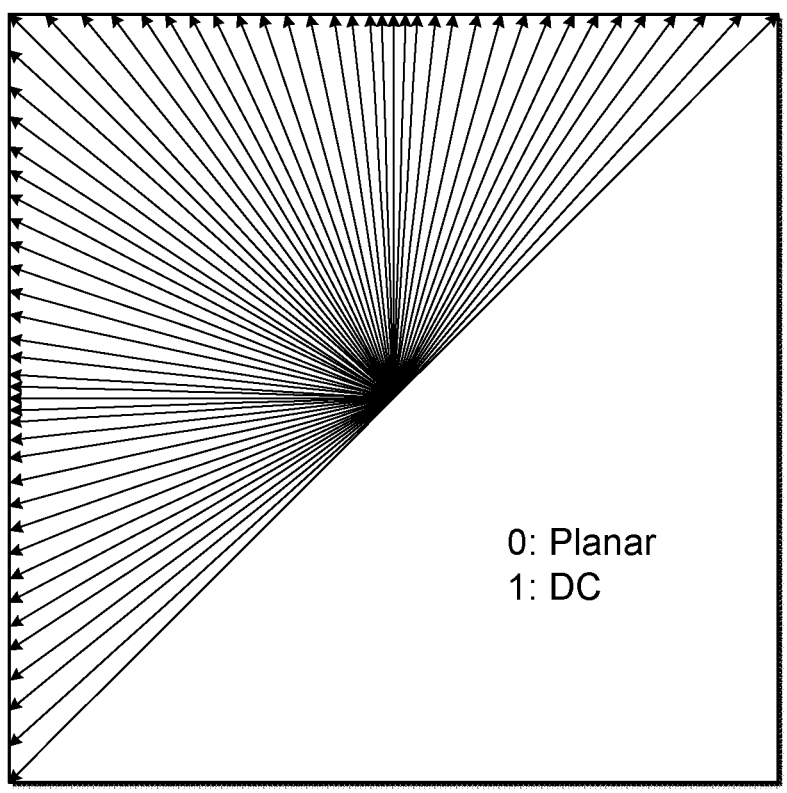
FIG. 8 depicts 67 possible intra prediction modes for luma components in JVET.

When coding a CU's luma component, the encoder can generate a list of candidate intra prediction modes. While HEVC had 35 possible intra prediction modes for luma components, in NET there are 67 possible intra prediction modes for luma components. These include a planar mode that uses a three dimensional plane of values generated from neighboring pixels, a DC mode that uses values averaged from neighboring pixels, and the 65 directional modes shown in FIG. 8 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for NET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 702 can be smoothed further with a position dependent intra prediction combination (PDPC) process that adjusts a prediction CU 702 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 706, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 702 using those motion vectors. In some cases, when motion vectors have been found for individual sub-CUs, Overlapped Block Motion Compensation (OBMC) can be used when generating a prediction CU 702 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 702 generated with each of the two motion vectors can be found, and the two motion vectors can be refined by replacing them with new motion vectors that best point to the combined prediction CU 702. The two refined motion vectors can be used to generate the final prediction CU 702.

At 708, once a prediction CU 702 has been found with intra prediction at 704 or inter prediction at 706 as described above, the encoder can subtract the prediction CU 702 from the current CU 102 find a residual CU 710.

The encoder can use one or more transform operations at 712 to convert the residual CU 710 into transform coefficients 714 that express the residual CU 710 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 714 after a forward core transform. The MDNSST operation can use a Hypercube-Givens Transform (HyGT) based on rotation data. When used, an index value identifying a particular MDNSST operation can be signaled by the encoder.

At 716, the encoder can quantize the transform coefficients 714 into quantized transform coefficients 716. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 714 can be converted into quantized transform coefficients 716 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 720, the encoder can find final compression bits 722 by entropy coding the quantized transform coefficients 718. Entropy coding aims to remove statistical redundancies of the information to be transmitted. In JVET, CABAC (Context Adaptive Binary Arithmetic Coding) can be used to code the quantized transform coefficients 718, which uses probability measures to remove the statistical redundancies. For CUs 102 with non-zero quantized transform coefficients 718, the quantized transform coefficients 718 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 718 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 722 of residual CUs 710, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 718 to find the final compression bits 722, the encoder can also use the quantized transform coefficients 718 to generate reconstructed CUs 734 by following the same decoding process that a decoder would use to generate reconstructed CUs 734. Thus, once the transformation coefficients have been computed and quantized by the encoder, the quantized transform coefficients 718 may be transmitted to the decoding loop in the encoder. After quantization of a CU's transform coefficients, a decoding loop allows the encoder to generate a reconstructed CU 734 identical to the one the decoder generates in the decoding process. Accordingly, the encoder can use the same reconstructed CUs 734 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 726. For example, in the decoding process shown in FIG. 7 in the encoder, the quantized transform coefficients 718 of a residual CU 710 can be dequantized at 724 to find dequantized transform coefficients 726. If an MDNSST operation was performed during encoding, that operation can be reversed after dequantization.

At 728, the dequantized transform coefficients 726 can be inverse transformed to find a reconstructed residual CU 730, such as by applying a DCT to the values to obtain the reconstructed image. At 732 the reconstructed residual CU 730 can be added to a corresponding prediction CU 702 found with intra prediction at 704 or inter prediction at 706, in order to find a reconstructed CU 734.

At 736, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 738 for inter prediction of future CUs 102 at 706.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 9:
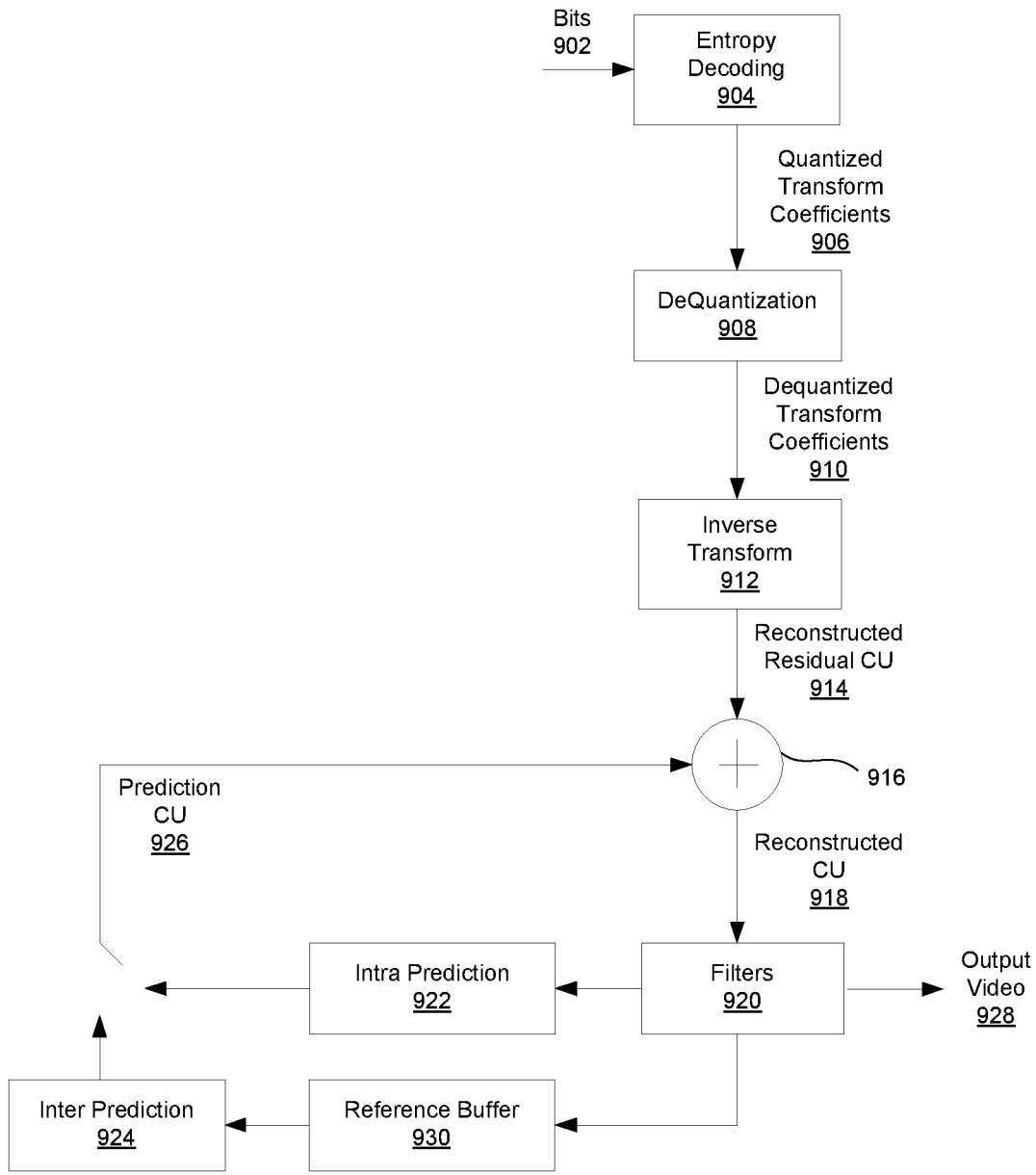
FIG. 9 depicts a simplified block diagram for CU coding in a JVET encoder.

FIG. 9 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure. By way of a non-limiting example, the bitstream can identify how CUs 102 were partitioned from each CTU 100 in a QTBT using quadtree partitioning, symmetric binary partitioning, and/or asymmetric binary partitioning. The bitstream can also indicate prediction information for the CUs 102 such as intra prediction modes or motion vectors, and bits 902 representing entropy encoded residual CUs.

At 904 the decoder can decode the entropy encoded bits 902 using the CABAC context models signaled in the bitstream by the encoder. The decoder can use parameters signaled by the encoder to update the context models' probabilities in the same way they were updated during encoding.

After reversing the entropy encoding at 904 to find quantized transform coefficients 906, the decoder can dequantize them at 908 to find dequantized transform coefficients 910. If an MDNSST operation was performed during encoding, that operation can be reversed by the decoder after dequantization.

At 912, the dequantized transform coefficients 910 can be inverse transformed to find a reconstructed residual CU 914. At 916, the reconstructed residual CU 914 can be added to a corresponding prediction CU 926 found with intra prediction at 922 or inter prediction at 924, in order to find a reconstructed CU 918.

At 920, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 920 to match the filtered reconstructed frame in the encoder.

After reconstructed pictures have been generated by finding reconstructed CUs 918 and applying signaled filters, the decoder can output the reconstructed pictures as output video 928. If reconstructed pictures are to be used as reference pictures, they can be stored in a reference buffer 930 for inter prediction of future CUs 102 at 924.

Figure 10:
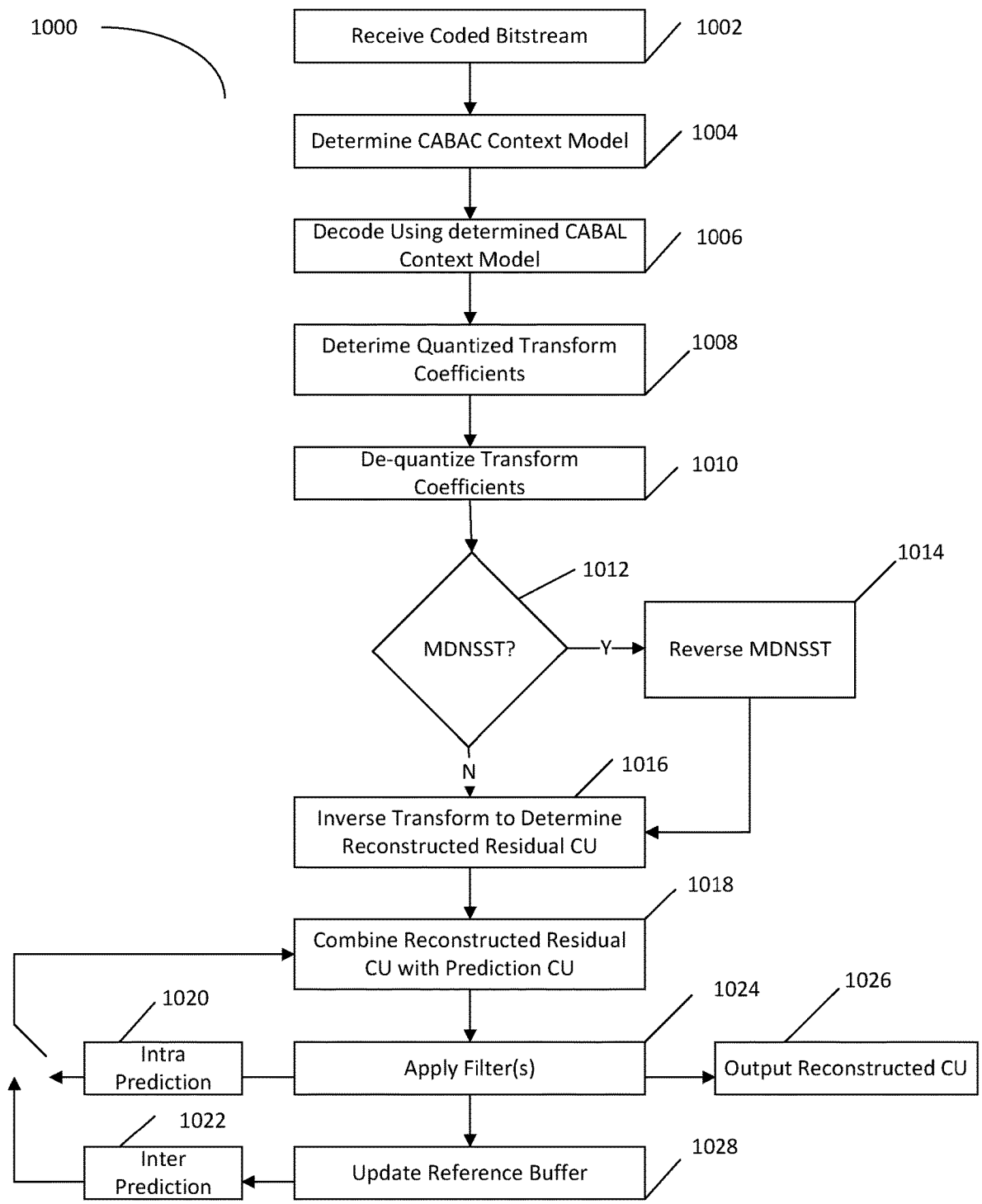
FIG. 10 depicts an embodiment of a method of CU coding in a JVET encoder.

FIG. 10 depicts an embodiment of a method of CU coding 1000 in a JVET decoder. In the embodiment depicted in FIG. 10, in step 1002 an encoded bitstream 902 can be received and then in step 1004 the CABAC context model associated with the encoded bitstream 902 can be determined and the encoded bitstream 902 can then be decoded using the determined CABAC context model in step 1006.

In step 1008, the quantized transform coefficients 906 associated with the encoded bitstream 902 can be determined and de-quantized transform coefficients 910 can then be determined from the quantized transform coefficients 906 in step 1010.

In step 1012, it can be determined whether an MDNSST operation was performed during encoding and/or if the bitstream 902 contains indications that an MDNSST operation was applied to the bitstream 902. If it is determined that an MDNSST operation was performed during the encoding process or the bitstream 902 contains indications that an MDNSST operation was applied to the bitstream 902, then an inverse MDNSST operation 1014 can be implemented before an inverse transform operation 912 is performed on the bitstream 902 in step 1016. Alternately, an inverse transform operation 912 can be performed on the bitstream 902 in step 1016 absent application of an inverse MDNSST operation in step 1014. The inverse transform operation 912 in step 1016 can determine and/or construct a reconstructed residual CU 914.

In step 1018, the reconstructed residual CU 914 from step 1016 can be combined with a prediction CU 918. The prediction CU 918 can be one of an intra-prediction CU 922 determined in step 1020 and an inter-prediction unit 924 determined in step 1022.

In step 1024, any one or more filters 920 can be applied to the reconstructed CU 914 and output in step 1026. In some embodiments filters 920 may not be applied in step 1024.

In some embodiments, in step 1028, the reconstructed CU 918 can be stored in a reference buffer 930.

Figure 11:
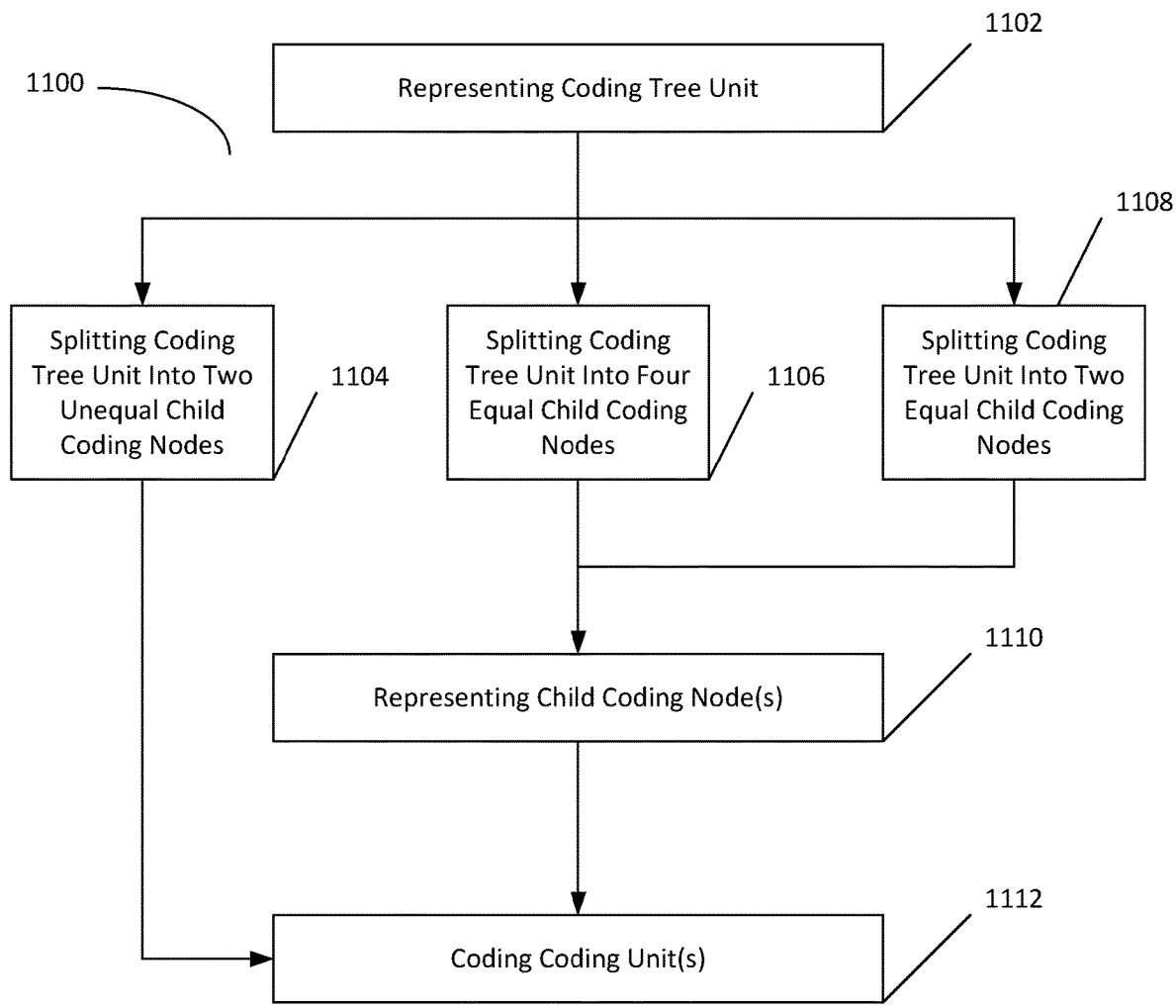
FIG. 11 depicts a simplified block diagram for CU coding in a JVET encoder.

FIG. 11 depicts a simplified block diagram 1100 for CU coding in a JVET encoder. In step 1102 a JVET coding tree unit can be represented as a root node in a quadtree plus binary tree (QTBT) structure. In some embodiments the QTBT can have a quadtree branching from the root node and/or binary trees branching from one or more of the quadtree's leaf nodes. The representation from step 1102 can proceed to step 1104, 1106 or 1108.

In step 1104, asymmetric binary partitioning can be employed to split a represented quadtree node into two blocks of unequal size. In some embodiments, the split blocks can be represented in a binary tree branching from the quadtree node as leaf nodes that can represent final coding units. In some embodiment, the binary tree branching from the quadtree node as leaf nodes represent final coding units in which further splitting is disallowed. In some embodiments the asymmetric partitioning can split a coding unit into blocks of unequal size, a first representing 25% of the quadtree node and a second representing 75% of the quadtree node.

In step 1106, quadtree partitioning can be employed to split a represented quadtree note into four square blocks of equal size. In some embodiments the split blocks can be represented as quadtree notes that represent final coding units or can be represented as child nodes that can be split again with quadtree partitioning, symmetric binary partitioning, or asymmetric binary partitioning.

In step 1108 quadtree partitioning can be employed to split a represented quadtree note into two blocks of equal size. In some embodiments the split blocks can be represented as quadtree notes that represent final coding units or can be represented as child nodes that can be split again with quadtree partitioning, symmetric binary partitioning, or asymmetric binary partitioning.

In step 1110, child nodes from step 1106 or step 1108 can be represented as child nodes configured to be encoded. In some embodiments the child nodes can be represented by leaf notes of the binary tree with JVET.

In step 1112, coding units from step 1104 or 1110 can be encoded using JVET.

Figure 12:
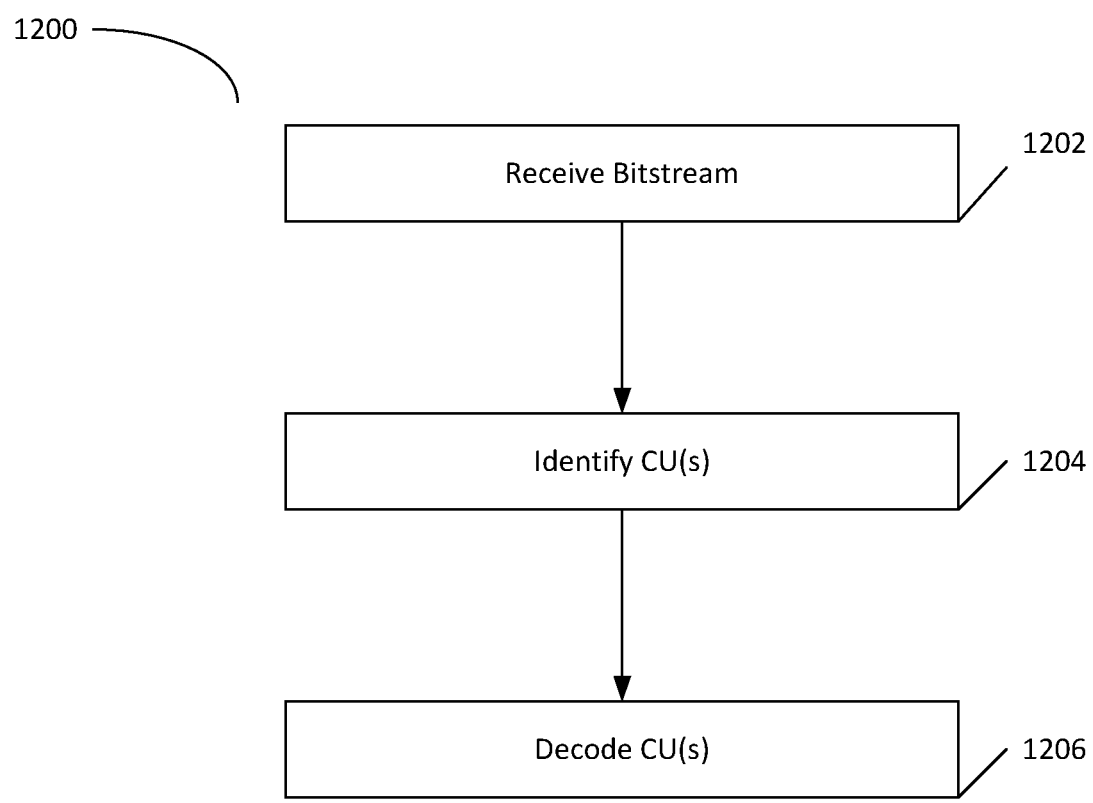
FIG. 12 depicts a simplified block diagram for CU decoding in a JVET decoder.

FIG. 12 depicts a simplified block diagram 1200 for CU decoding in a JVET decoder. In the embodiment depicted in FIG. 12, in step 1202 a bitstream indicating how a coding tree unit was partitioned into coding units according to a QTBT structure can be received. The bitstream can indicate how quadtree nodes are split with at least one of quadtree partitioning, symmetric binary partitioning or asymmetric binary partitioning.

In step 1204, coding units, represented by leaf nodes of the QTBT structure can be identified. In some embodiments, the coding units can indicate whether a node was split from a quadtree leaf node using asymmetric binary partitioning. In some embodiments, the coding unit can indicate that the node represents a final coding unit to be decoded.

In step 1206, the identified coding unit(s) can be decoded using JVET.

Figures 13A, 13B:
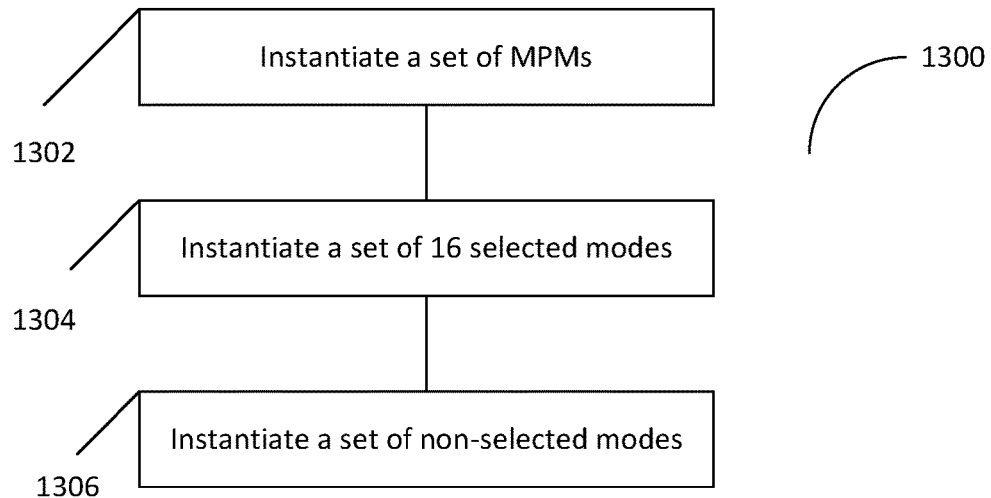
FIG. 13A depicts an alternate simplified block diagram for JVET coding for intra mode prediction.
FIG. 13B depicts a table of alternate JVET coding for intra mode prediction.

FIG. 13A depicts an alternate simplified block diagram for JVET coding for intra mode prediction 1300. In the embodiment depicted in FIG. 13A, in step 1302 a set of MPMs can be identified and instantiated in memory, then in step 1304 a set of 16 selected modes can be identified and instantiated in memory and in step 1304 the balance of the 67 modes can be defined and instantiated in memory. In some embodiments, the set of MPMs can be reduced from the standard set of 6 MPMs. In some embodiments the set of MPMs can include 5 unique modes, the selected modes can include 16 unique mode and the non-selected modes set can include the remaining 46 non-selected unique modes. However, in alternate embodiments the set of MPMs can be include fewer unique modes, the selected modes can remain fixed with 16 unique modes and the non-selected unique modes set size can be adjusted accordingly to accommodate the total of 67 modes. In some alternate embodiments, in alternate embodiments the set of MPMs can be include fewer unique modes, the selected modes can remain fixed with 16 unique modes and the non-selected unique modes set size can be adjusted accordingly to accommodate the total of 67 modes and/or the balance of any number of total modes that can be greater or less than 67 total modes. In still further alternate embodiments the set of MPMs can be include more than 6 unique modes, the selected modes can remain fixed with 16 unique modes and the non-selected unique modes set size can be adjusted accordingly to accommodate the total of 67 modes and/or the balance of any number of total modes that can be greater or less than 67 total modes.

By way of non-limiting example, in some embodiments in which the set of MPMs includes 5 unique modes, instead of six MPMs, the number of bins assigned for MPM modes can be equal to, or less than, five bins if a truncated unary binarization is used and new binarization for 5 MPMs can be utilized. Thus, in some embodiments, the 16 selected modes among the 62 remaining intra modes can be generated by evenly sub sampling these 62 intra modes and each can be coded with 4 bits of fixed length code. By way of non-limiting example, if one assumes the remaining 62 modes are indexed as {0, 1, 2, . . . , 61}, then the 16 selected modes={0, 4, 8, 12, 16, 20, 24, 28, 32, 36, 40, 44, 48, 52, 56, 60}. And the remaining 46 non-selected modes={1, 2, 3, 5, 6, 7, 9, 10 . . . 59, 61}, wherein such 46 non-selected modes can be coded with truncated binary code.

FIG. 13B depicts a table 1308 of alternate JVET coding for intra mode prediction in accordance with the FIG. 13A. In the embodiment depicted in FIG. 13B, the intra prediction modes 1310 are shown as comprising 5 MPMs, 16 selected modes and 46 non-selected modes wherein the bin strings 1312 for the MPMs can be encoded using truncated unary binarization, the 16 selected modes can be coded using 4 bits of fixed length code and the 46 non-selected modes can be coded using truncated binary coding.

In alternate embodiments of FIG. 13A, 6 MPMs, can be utilized, but only the first five MPMs on the MPM list can be binarized as shown in FIG. 13B, and can be coded with context based method(s) described in the JVET documents/standards. The sixth MPM on the MPM list can then be considered as one of the 16 selected modes and coded with 4 bits of fixed length code along with other 15 selected modes.

By way of non-limiting example, if the remaining 61 modes are indexed as {0, 1, 2, . . . , 60}, 15 selected modes can be obtained by evenly subsampling the remaining 61 intra modes as follows: The 15 selected modes set can be {0, 5, 10, 14, 18, 22, 26, 30, 34, 38, 42, 46, 50, 55, 60} wherein the 15 selected modes plus the sixth MPM can be coded with 4 bits of fixed length code, as in the following set: {Sixth MPM, 0, 5, 10, 14, 18, 22, 26, 30, 34, 38, 42, 46, 50, 55, 60} and the balance of the 46 non-selected modes are shown in the following set and coded with truncated binary code as Non-selected modes set={1, 2, 3, 4, 6, 7, 8, 9, 11, 12 . . . 49, 51, 52, 53, 54, 56, 57, 58, 59}.

In yet further alternate embodiments of FIG. 13A, the first five MPMs on the MPM list can be binarized as shown in FIG. 13B and coded with current context based method(s) described in the JVET documents/standards. In such an embodiment, the sixth MPM on the MPM list can be considered as one of 16 selected modes and coded with 4 bits of fixed length code along with the other 15 selected modes. Accordingly, the selection of the other 15 selected modes can be established using any known convenient and/or desired selection process. By way of non-limiting example, they can be selected around the MPM modes, or around the (content-based) statistically popular modes, or around trained or historically popular modes, or using other known, convenient and/or desired method(s) or process(es). Again, the choice of 5 MPMs is merely a non-limiting example and in alternate embodiments the set of MPMs can be reduced further to 4 or 3 MPMs or expanded to more than 6, wherein there are still 16 selected modes and the balance of the 67 (or other known, convenient and/or desired total number of) intra coding modes are included in the non-selected set of intra coding modes. That is, embodiments in which the total number of intra coding modes are greater than or less than 67 are contemplated, as are embodiments in which the MPM set containing any known convenient or desired number of MPMs, and the quantity of selected modes can be any known convenient and/or desired quantity.

Figure 14:
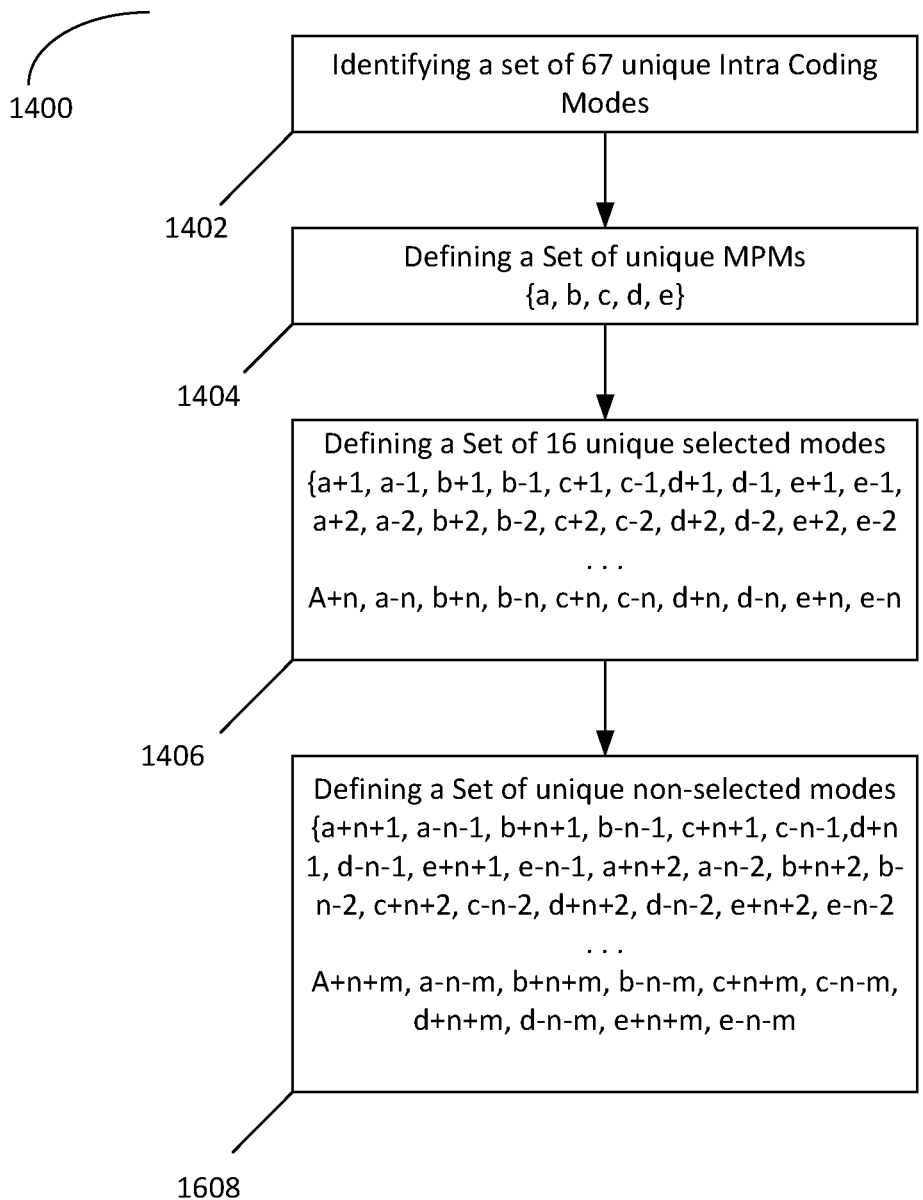
FIG. 14 depicts a simplified block diagram of a method for sequencing of intra coding modes.

In some embodiments, the determination of the order of selected and non-selected modes can be established via the method 1400 depicted in FIG. 14. In the embodiment depicted in FIG. 14, an initial set of 67 unique intra coding modes are defined as 0-66 in step 1402. In step 1404 a first subset of the initial set of 67 unique coding modes, integers 0-66, are selected as MPMs. Such first subset of MPMs can contain 3, 4, 5 or 6 unique MPMs selected from the 0-66 modes. Then in step 1406, a second subset of 16 selected modes can be identified by adding 1 to n and subtracting 1 to n from each of the selected MPMs until a set of 16 non-selected modes that are distinct from the first MPMs are defined. The remaining modes of the 67 coding modes can then be ordered within a set of non-selected modes in step 1408 by continuing to add ever-increasing integers to and subtract ever-increasing integers from the initial MPMs until all modes previously unassigned to the MPM set and the selected modes set are ordered within the non-selected set. In some embodiments, the technique of adding 1/subtracting 1 may be applied to a subset of the MPMs.

The modes can be defined by a coding order based on one or more criteria. By way of non-limiting example, for a current block, the possible intra modes can be ordered into a virtual priority list according to one or more criteria, such as their expected (or estimated) probabilities (or populari- ties) and/or the intra mode order can be performed using indexing to indicate an order.

As described herein, an exemplary priority list is referred to in order to provide examples of use of the broader system and method. However, it should be understood that the system and method can provide at least one of a physical list or a virtual ordering. That is, a physical list may not be required in some embodiments. The reference to a priority list herein, in other words, is intended as interchangeable with any scheme that is able to identify a coding order for the set of infra modes. The ordering can be performed by way of an indexing scheme or list, such as a list of modes ordered in the list based on a priority. Ordering based on a priority can be defined based on the concepts disclosed herein, such as by including the modes using the fewest number of bins at the top, the list ordered in increasing order of bins used from top to bottom. Thus, the highest mode on the list can be considered to have the highest priority. In some embodiments, the lists can be ordered based on other criteria, such as preferences for coding order. Once the order of intra modes is identified, the intra modes can be divided into categories.

In a first non-limiting example embodiment of an ordered priority list, the priority list can be constructed as follows:

intra modes of left (L) and above (A) neighboring blocks can be established, then planar mode and DC mode can be established and intra modes of bottom-left (BL), above-right (AR) and above-left (AL) neighboring blocks can be identified.

Then, intra modes of L, A, BL, AR and AL neighboring blocks can be incremented and decremented by 1, if they are angular modes, Then vertical mode, horizontal mode, diagonal angular mode (2), and diagonal mode (34) can be identified.

Additional modes can then be established by:

decrementing and incrementing intra modes of L, A, BL, AR and AL neighboring blocks by 2, if they are angular modes, decrementing and incrementing vertical, horizontal and diagonal modes by 1, decrementing and incrementing intra modes of L, A, BL, AR and AL neighboring blocks by 3, if they are angular modes, and decrementing and incrementing vertical, horizontal and diagonal modes by 2, then repeating the pattern with increasing integer values but bypassing or eliminating any mode that is the result of the incrementing or decrementing process, if the resulting mode has already been identified and ordered to eliminate duplicate modes from the rank ordering.

In alternate non-limiting exemplary embodiments, an ordered priority list can be constructed as follows:

Determine intra modes of left (L), above (A) neighboring blocks, and planar mode and DC mode, Determine intra modes of bottom-left (BL), above-right (AR) and above-left (AL) neighboring blocks.

Then decrement and increment intra modes of L, A, BL, AR and AL neighboring blocks by 1, if they are angular modes, and determine vertical mode, horizontal mode, diagonal angular mode (2), and diagonal mode (34).

Then successively decrementing and incrementing vertical, horizontal modes by an increasing integer (i.e. 1, 2, 3, 4, 5 . . . ) until all 67 modes have been rank ordered. Again, bypassing or eliminating any mode that is the result of the incrementing or decrementing process, if the resulting mode has already been identified and ordered to eliminate duplicate modes from the rank ordering.

In another non-limiting, exemplary embodiment of an ordered priority list, the priority list can be constructed as follows:

Determine intra modes of left (L) and above (A) neighboring blocks, and planar mode and DC mode.

Determine intra modes of bottom-left (BL), above-right (AR) and above-left (AL) neighboring blocks Decrementing and incrementing intra modes of L, A, BL, AR and AL neighboring blocks by 1, if they are angular modes, Determining vertical mode, horizontal mode, diagonal angular mode (2), and diagonal mode (34).

Then successively decrementing and incrementing vertical, horizontal modes by an increasing integer (i.e. 1, 2, 3, 4, 5 . . . ) until the 67 modes have been rank ordered. Again, bypassing or eliminating any mode that is the result of the incrementing or decrementing process, if the resulting mode has already been identified and ordered to eliminate duplicate modes from the rank ordering.

The arithmetic operations for angular mode indices can be in a circular manner. For example, in the current JVET, there are 65 (67−2) angular modes that can be indexed from 2 to 66. Hence, if an integer is added or subtracted from an angular mode with such indexing, the resulting mode still be one of angular modes of 2, 3, . . . , 66. For example, adding 1 to mode 66 results in mode 2 (i.e. 66+1=>2), and subtracting 1 from mode 2 results in mode 66 (i.e. 2−1=>66).

As noted previously in some embodiments, a pruning process can be incorporated to remove duplicate modes. A pruning process that removes the duplicated modes in the above processes can cause unique modes to be constructed in the rank ordering.

Below is presented another exemplary, non-limiting example for including intra modes not included in the MPM mode category and the selected mode category to be included in the non-selected mode category and have the priority to be assigned with smaller numbers of bins according to their positions in the priority list.

By way of non-limiting example, consider a current block that has five (L, A, BL, AR and AL) neighboring blocks, as illustrated in FIG. 1a. Then, consider that the intra modes of the five neighboring blocks are 4, 38, 7, 45 and 41. The 67 intra modes can be ordered in a priority list as follows:

intra modes of L and A neighboring blocks can be determined: 4 (L), 38 (A)

planar and DC modes can be established: 0 (planar), 1 (DC)

intra modes of BL, AR and AL neighboring blocks can be determined: 7 (BL), 45 (AR), 41 (AL).

decrement and increment intra modes of L, A, BL, AR and AL neighboring blocks by 1: 3 (4−1), 5 (4+1), 37 (38−1), 39 (38+1), 6 (7−1), 8 (7+1), 44 (45−1), 46 (45+1), 40 (41−1), 42 (41+1), determine vertical/horizontal/diagonal modes: 50 (vertical), 18 (horizontal), 2 (diagonal), and 34 (diagonal).

decrement and increment intra modes of L, A, BL, AR and AL neighboring blocks by 2: 36 (38−2), 9 (7+2), 43 (45−2), 47 (45+2), decrement and increment vertical, horizontal and diagonal modes by 1: 49 (50−1), 51 (50+1), 17 (18−1), 19 (18+1), 66 (2−1), 33 (34−1), 35 (34+1), Continue the incrementing and decrementing process using progressively larger integers and a pruning process until all 67 modes are rank ordered.

In yet another non-limiting example, six modes can be allowed in the MPM list. As described above, in one or more embodiments, these six modes can be the first 6 modes on the top of the priority list. Thus, according to the priority list above, the first 6 modes are modes 4, 38, 0, 1, 7, and 45. These six MPM modes can be assigned to bins in accordance with the disclosed techniques. As described herein, in one or more embodiments the MPM modes can be assigned up to five bins utilizing truncated unary binarization.

In accordance with the example described herein, the next 16 modes on the priority list can be in the selected mode category. In accordance with the example priority list above, the selected modes are modes 41, 3, 5, 37, 39, 6, 8, 44, 46, 40, 42, 50, 18, 2, 34 and 36. As described above, in one or more embodiments each of these selected modes can be assigned 4 bins of fixed length code.

In accordance with the one or more embodiments with three categories described, the rest of the intra modes can be included in the non-selected mode category. As described above, in one or more embodiments these modes can be assigned 5 or 6 bins using truncated binary code according to their positions in the priority list.

In a further non-limiting example, assume that five modes are allowed in the MPM list, where these five modes are the first 5 modes on the top of the priority list. In the example priority list above, the modes corresponding to the top 5 modes in the priority list can be modes 4, 38, 0, 1, and 7. As described above in one or more embodiments, these 5 MPM modes can be assigned up to four bins using truncated unary binarization.

In accordance with the non-limiting example described herein, the next 16 modes on the priority list can be in the selected mode category. In accordance with the example priority list above, the selected modes are modes 45, 41, 3, 5, 37, 39, 6, 8, 44, 46, 40, 42, 50, 18, 2, and 34. As described above in one or more embodiments each of these selected modes can be assigned 4 bins of fixed length code. In accordance with the one or more embodiments with three categories described, the rest of the intra modes can be included in the non-selected mode category. As described above, in one or more embodiments these modes can be assigned 5 or 6 bins using truncated binary code according to their positions in the priority list.

As a further non-limiting example embodiment, a current block has five (L, A, BL, AR and AL) neighboring blocks, as shown in FIG. 1a. The intra modes of the five neighboring blocks are 4, 38, 7, 45 and 41. The 67 intra modes can be ordered in a priority list as follows.

intra modes of L and A neighboring blocks can be determined: 4 (L), 38 (A)

planar and DC modes are established: 0 (planar), 1 (DC)

intra modes of BL, AR and AL neighboring blocks are determined: 7 (BL), 45 (AR), 41 (AL)

intra modes of L, A, BL, AR and AL neighboring blocks are decremented and incremented by 1: 3 (4−1), 5 (4+1), 37 (38−1), 39 (38+1), 6 (7−1), 8 (7+1), 44 (45−1), 46 (45+1), 40 (41−1), 42 (41+1), vertical/horizontal/diagonal modes are established: 50 (vertical), 18 (horizontal), 2 (diagonal), and 34 (diagonal).

intra modes of vertical and horizontal modes are decremented and incremented by 1: 49 (50−1), 51 (50+1), 17 (18−1), 19 (18+1), intra modes of vertical and horizontal modes are decremented and incremented by 2: 48 (50−2), 52 (50+2), 16 (18−2), 20 (18+2), the incrementing and decrementing process can then be continued using progressively larger integers and a pruning process until all 67 modes are rank ordered.

In the non-limiting example, if six modes are allowed in the MPM list, these six modes can be the first 6 modes on the top of the priority list. In accordance with the example priority list above, the first 6 MPMs would be modes 4, 38, 0, 1, 7, and 45. As described above in one or more embodiments, these six MPM modes can be assigned up to five bins using truncated unary binarization.

In accordance with the non-limiting example, the next 16 modes on the priority list can be in the selected mode category. In accordance with the example priority list above, the selected modes are modes 41, 3, 5, 37, 39, 6, 8, 44, 46, 40, 42, 50, 18, 2, 34 and 49. As described above in one or more embodiments each of these selected modes can be assigned 4 bins of fixed length code.

In accordance with the one or more embodiments with three categories described, the rest of the intra modes can be included in the non-selected mode category. As described above in one or more embodiments these modes can be assigned 5 or 6 bins using truncated binary code according to their positions in the priority list.

In one or more non-limiting exemplary embodiments, five modes can be allowed in the MPM list, where these five modes are the first 5 modes on the top of the priority list. In accordance with the example priority list above, these are modes 4, 38, 0, 1, and 7. As described above in one or more embodiments, these 5 MPM modes can be assigned up to four bins using truncated unary binarization.

In accordance with the example described herein, the next 16 modes on the priority list can be in the selected mode category. In accordance with the example priority list above, the selected modes are modes 45, 41, 3, 5, 37, 39, 6, 8, 44, 46, 40, 42, 50, 18, 2, and 34. As described above in one or more embodiments each of these selected modes can be assigned 4 bins of fixed length code.

In accordance with the one or more embodiments with three categories described, the rest of intra modes can be included in the non-selected mode category. As described above in one or more embodiments these modes can be assigned 5 or 6 bins using truncated binary code according to their positions in the priority list.

In yet another non-limiting example embodiment, a current block can have five (L, A, BL, AR and AL) neighboring blocks, as shown in FIG. 1a. The intra modes of the five neighboring blocks can be 4, 38, 7, 45 and 41. The 67 intra modes can be ordered in a priority list as follows:

intra modes of L and A neighboring blocks can be established: 4 (L), 38 (A)

planar and DC modes can be established: 0 (planar), 1 (DC).

intra modes of BL, AR and AL neighboring blocks can be determined: 7 (BL), 45 (AR), 41 (AL).

decrement and increment intra modes of L, A, BL, AR and AL neighboring blocks by 1: 3 (4−1), 5 (4+1), 37 (38−1), 39 (38+1), 6 (7−1), 8 (7+1), 44 (45−1), 46 (45+1), 40 (41−1), 42 (41+1), vertical/horizontal/diagonal modes can be established: 50 (vertical), 18 (horizontal), 2 (diagonal), and 34 (diagonal).

decrement and increment intra modes of vertical, horizontal and diagonal modes by 1: 49 (50−1), 51 (50+1), 17 (18−1), 19 (18+1), 66 (2−1), 33 (34−1), 35 (34+1), decrement and increment intra modes of vertical, horizontal and diagonal modes by 2: 48 (50−2), 52 (50+2), 16 (18−2), 20 (18+2), 65 (2−2), 32 (34−2), 36 (34+2), Continue the incrementing and decrementing process using progressively larger integers and a pruning process until all 67 modes are rank ordered.

In one or more embodiments, six modes can be allowed in the MPM list, where these six modes are the first 6 modes on the top of the priority list. In accordance with the example priority list above, they are modes 4, 38, 0, 1, 7, and 45. As described above in one or more embodiments, these six MPM modes can be assigned up to five bins using truncated unary binarization.

In accordance with the example described herein, the next 16 modes on the priority list can be in the selected mode category. In accordance with the example priority list above, the selected modes are modes 41, 3, 5, 37, 39, 6, 8, 44, 46, 40, 42, 50, 18, 2, 34 and 49. As described above in one or more embodiments, each of these selected modes can be assigned 4 bins of fixed length code.

In accordance with the one or more embodiments with three categories described, the rest of intra modes can be included in the non-selected mode category. As described above in one or more embodiments, these modes can be assigned 5 or 6 bins using truncated binary code according to their positions in the priority list.

In one or more embodiments, five modes can be allowed in the MPM list, where these five modes are the first 5 modes on the top of the priority list. In accordance with the example priority list above, these can be modes 4, 38, 0, 1, and 7. As described above in one or more embodiments, these 5 MPM modes can be assigned up to four bins using truncated unary binarization.

In accordance with the example described herein, the next 16 modes on the priority list can be in the selected mode category. In accordance with the example priority list above, the selected modes can be modes 45, 41, 3, 5, 37, 39, 6, 8, 44, 46, 40, 42, 50, 18, 2, and 34. As described above in one or more embodiments. each of these selected modes can be assigned 4 bins of fixed length code.

In accordance with the one or more embodiments with three categories described, the rest of intra modes can be included in the non-selected mode category. As described above in one or more embodiments, these modes can be assigned 5 or 6 bins using truncated binary code according to their positions in the priority list.

In one or more embodiments, the MPM mode category (or MPM list) can be limited to a selected few modes in the priority list. In one or more embodiments, the MPM mode category includes only the first few intra modes on the top of the priority list. For example, the current JVET allows only up to 6 modes in the MPM list. Alternatives for the MPM list are contemplated, such as allowing up to five modes in the MPM list or fewer. In still further alternate embodiments, systems can include fewer or more than 67 coding modes and the number of modes contained in each of the MPM list, selected modes list and non-selected modes list can be of any known, convenient and/or desired size.

Figure 15:
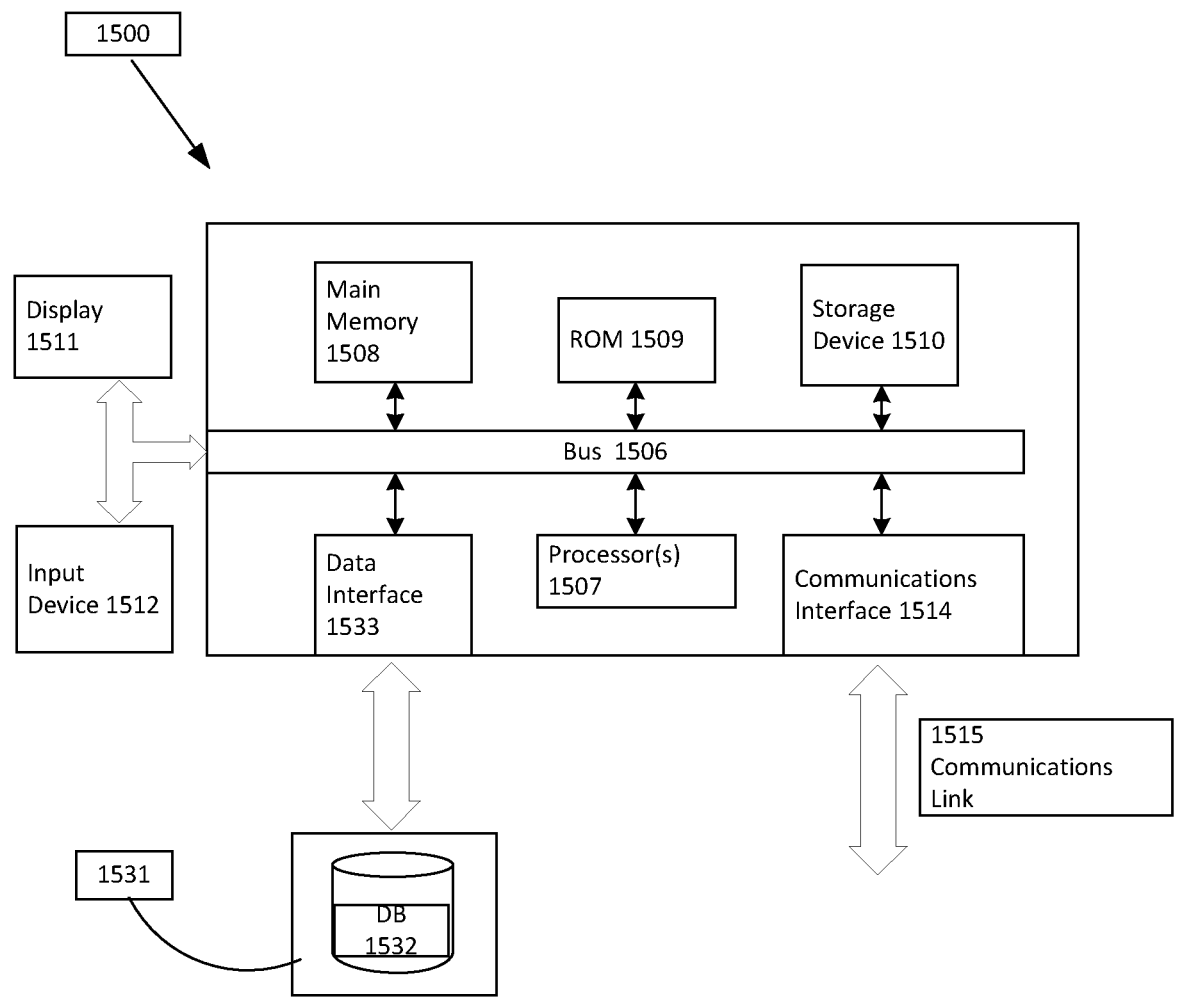
FIG. 15 depicts an embodiment of a computer system adapted and/or configured to process a method of CU coding.

The execution of the sequences of instructions required to practice the embodiments can be performed by a computer system 1500 as shown in FIG. 15. In an embodiment, execution of the sequences of instructions is performed by a single computer system 1500. According to other embodiments, two or more computer systems 1500 coupled by a communication link 1515 can perform the sequence of instructions in coordination with one another. Although a description of only one computer system 1500 will be presented below, however, it should be understood that any number of computer systems 1500 can be employed to practice the embodiments.

A computer system 1500 according to an embodiment will now be described with reference to FIG. 15, which is a block diagram of the functional components of a computer system 1500. As used herein, the term computer system 1500 is broadly used to describe any computing device that can store and independently run one or more programs.

Each computer system 1500 can include a communication interface 1514 coupled to the bus 1506. The communication interface 1514 provides two-way communication between computer systems 1500. The communication interface 1514 of a respective computer system 1500 transmits and receives electrical, electromagnetic or optical signals that include data streams representing various types of signal information, e.g., instructions, messages and data. A communication link 1515 links one computer system 1500 with another computer system 1500. For example, the communication link 1515 can be a LAN, in which case the communication interface 1514 can be a LAN card, or the communication link 1515 can be a PSTN, in which case the communication interface 1514 can be an integrated services digital network (ISDN) card or a modem, or the communication link 1515 can be the Internet, in which case the communication interface 1514 can be a dial-up, cable or wireless modem.

A computer system 1500 can transmit and receive messages, data, and instructions, including program, i.e., application, code, through its respective communication link 1515 and communication interface 1514. Received program code can be executed by the respective processor(s) 1507 as it is received, and/or stored in the storage device 1510, or other associated non-volatile media, for later execution.

In an embodiment, the computer system 1500 operates in conjunction with a data storage system 1531, e.g., a data storage system 1531 that contains a database 1532 that is readily accessible by the computer system 1500. The computer system 1500 communicates with the data storage system 1531 through a data interface 1533. A data interface 1533, which is coupled to the bus 1506, transmits and receives electrical, electromagnetic or optical signals, that include data streams representing various types of signal information, e.g., instructions, messages and data. In embodiments, the functions of the data interface 1533 can be performed by the communication interface 1514.

Computer system 1500 includes a bus 1506 or other communication mechanism for communicating instructions, messages and data, collectively, information, and one or more processors 1507 coupled with the bus 1506 for processing information. Computer system 1500 also includes a main memory 1508, such as a random access memory (RAM) or other dynamic storage device, coupled to the bus 1506 for storing dynamic data and instructions to be executed by the processor(s) 1507. The main memory 1508 also can be used for storing temporary data, i.e., variables, or other intermediate information during execution of instructions by the processor(s) 1507.

The computer system 1500 can further include a read only memory (ROM) 1509 or other static storage device coupled to the bus 1506 for storing static data and instructions for the processor(s) 1507. A storage device 1510, such as a magnetic disk or optical disk, can also be provided and coupled to the bus 1506 for storing data and instructions for the processor(s) 1507.

A computer system 1500 can be coupled via the bus 1506 to a display device 1511, such as, but not limited to, a cathode ray tube (CRT) or a liquid-crystal display (LCD) monitor, for displaying information to a user. An input device 1512, e.g., alphanumeric and other keys, is coupled to the bus 1506 for communicating information and command selections to the processor(s) 1507.

According to one embodiment, an individual computer system 1500 performs specific operations by their respective processor(s) 1507 executing one or more sequences of one or more instructions contained in the main memory 1508. Such instructions can be read into the main memory 1508 from another computer-usable medium, such as the ROM 1509 or the storage device 1510. Execution of the sequences of instructions contained in the main memory 1508 causes the processor(s) 1507 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1507. Such a medium can take many forms, including, but not limited to, non-volatile, volatile and transmission media. Non-volatile media, i.e., media that can retain information in the absence of power, includes the ROM 1509, CD ROM, magnetic tape, and magnetic discs. Volatile media, i.e., media that can not retain information in the absence of power, includes the main memory 1508. Transmission media includes coaxial cables, copper wire and fiber optics, including the wires that comprise the bus 1506. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 16:
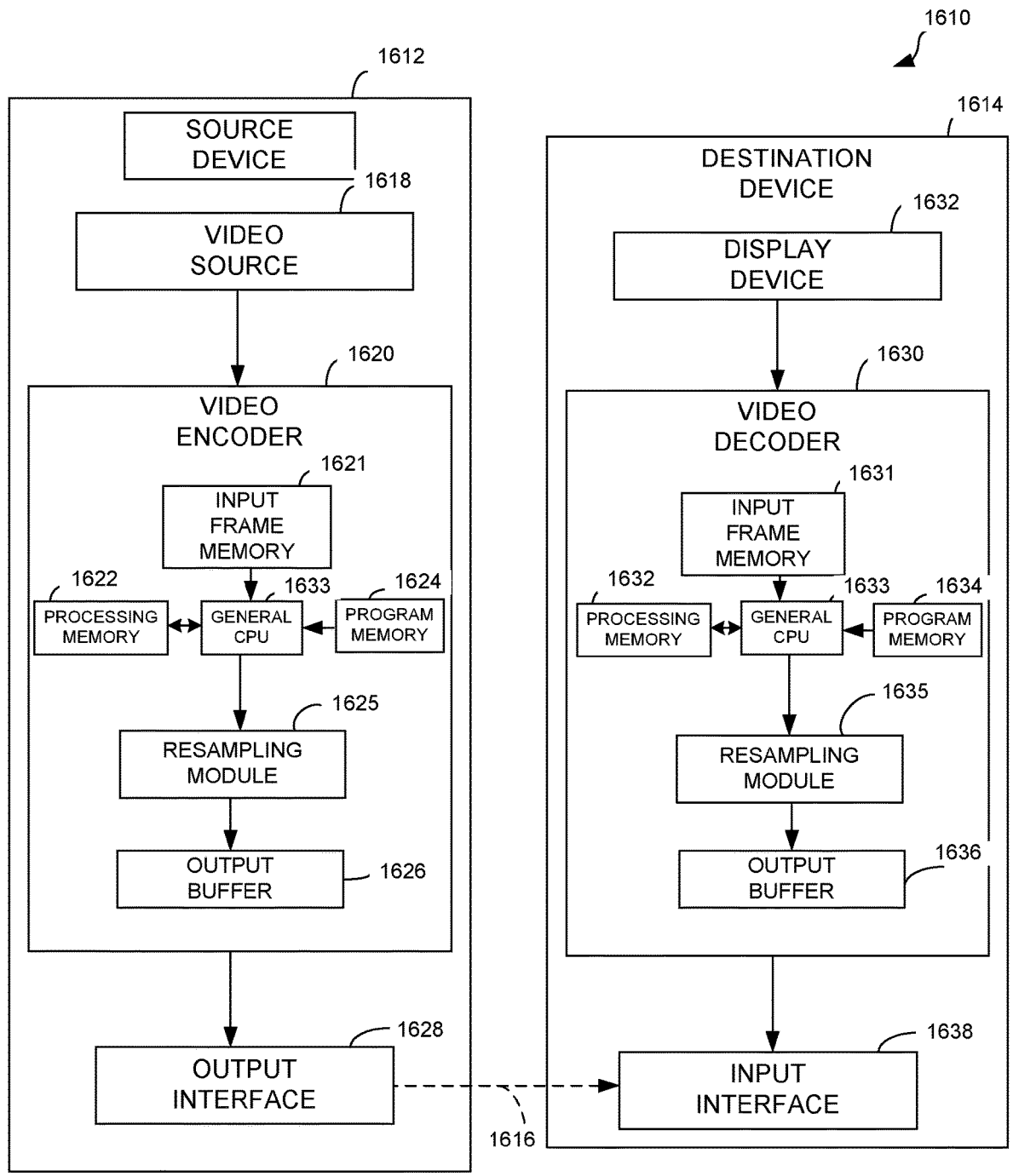
FIG. 16 depicts an embodiment of a coder/decoder system for CU coding/decoding in a JVET encoder/decoder.

FIG. 16 is a high level view of a source device 1612 and destination device 1610 that may incorporate features of the systems and devices described herein. As shown in FIG. 16, example video coding system 1610 includes a source device 1612 and a destination device 1616 where, in this example, the source device 1612 generates encoded video data. Accordingly, source device 1612 may be referred to as a video encoding device. Destination device 1616 may decode the encoded video data generated by source device 1612. Accordingly, destination device 1616 may be referred to as a video decoding device. Source device 1612 and destination device 1616 may be examples of video coding devices.

Destination device 1616 may receive encoded video data from source device 1612 via a channel 1616. Channel 1616 may comprise a type of medium or device capable of moving the encoded video data from source device 1612 to destination device 1616. In one example, channel 1616 may comprise a communication medium that enables source device 1612 to transmit encoded video data directly to destination device 1616 in real-time.

In this example, source device 1612 may modulate the encoded video data according to a communication standard, such as a wireless communication protocol, and may transmit the modulated video data to destination device 1616. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1612 to destination device 1616. In another example, channel 1616 may correspond to a storage medium that stores the encoded video data generated by source device 1612.

In the example of FIG. 16, source device 1612 includes a video source 1618, video encoder 1620, and an output interface 1622. In some cases, output interface 1628 may include a modulator/demodulator (modem) and/or a transmitter. In source device 1612, video source 1618 may include a source such as a video capture device, e.g., a video camera, a video archive containing previously captured video data, a video feed interface to receive video data from a video content provider, and/or a computer graphics system for generating video data, or a combination of such sources.

Video encoder 1620 may encode the captured, pre-captured, or computer-generated video data. An input image may be received by the video encoder 1620 and stored in the input frame memory 1621. The general purpose processor 1623 may load information from here and perform encoding. The program for driving the general purpose processor may be loaded from a storage device, such as the example memory modules depicted in FIG. 16. The general purpose processor may use processing memory 1622 to perform the encoding, and the output of the encoding information by the general processor may be stored in a buffer, such as output buffer 1626.

The video encoder 1620 may include a resampling module 1625 which may be configured to code (e.g., encode) video data in a scalable video coding scheme that defines at least one base layer and at least one enhancement layer. Resampling module 1625 may resample at least some video data as part of an encoding process, wherein resampling may be performed in an adaptive manner using resampling filters.

The encoded video data, e.g., a coded bit stream, may be transmitted directly to destination device 1616 via output interface 1628 of source device 1612. In the example of FIG. 16, destination device 1616 includes an input interface 1638, a video decoder 1630, and a display device 1632. In some cases, input interface 1628 may include a receiver and/or a modem. Input interface 1638 of destination device 1616 receives encoded video data over channel 1616. The encoded video data may include a variety of syntax elements generated by video encoder 1620 that represent the video data. Such syntax elements may be included with the encoded video data transmitted on a communication medium, stored on a storage medium, or stored a file server.

The encoded video data may also be stored onto a storage medium or a file server for later access by destination device 1616 for decoding and/or playback. For example, the coded bitstream may be temporarily stored in the input buffer 1631, then loaded in to the general purpose processor 1633. The program for driving the general purpose processor may be loaded from a storage device or memory. The general purpose processor may use a process memory 1632 to perform the decoding. The video decoder 1630 may also include a resampling module 1635 similar to the resampling module 1625 employed in the video encoder 1620.

FIG. 16 depicts the resampling module 1635 separately from the general purpose processor 1633, but it would be appreciated by one of skill in the art that the resampling function may be performed by a program executed by the general purpose processor, and the processing in the video encoder may be accomplished using one or more processors. The decoded image(s) may be stored in the output frame buffer 1636 and then sent out to the input interface 1638.

Display device 1638 may be integrated with or may be external to destination device 1616. In some examples, destination device 1616 may include an integrated display device and may also be configured to interface with an external display device. In other examples, destination device 1616 may be a display device. In general, display device 1638 displays the decoded video data to a user.

Video encoder 1620 and video decoder 1630 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1620 and video decoder 1630 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1620 and video decoder 1630 may be implemented in hardware, software, firmware or any combination thereof. For example, the video encoder 1620 and decoder 1630 may employ one or more processors, digital signal processors (DSPs), application specific integrated circuits (ASICs), field programmable gate arrays (FPGAs), discrete logic, or any combinations thereof. When the video encoder 1620 and decoder 1630 are implemented partially in software, a device may store instructions for the software in a suitable, non-transitory computer-readable storage medium and may execute the instructions in hardware using one or more processors to perform the techniques of this disclosure. Each of video encoder 1620 and video decoder 1630 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 1623 and 1633 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1623 and 1633.

A storage device may also store instructions, instructions, such as source code or binary code, for performing the techniques described above. A storage device may additionally store data used and manipulated by the computer processor. For example, a storage device in a video encoder 1620 or a video decoder 1630 may be a database that is accessed by computer system 1623 or 1633. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:

1. A method of prioritizing intra prediction coding modes for intra prediction coding, comprising:
 (a) defining a set of unique intra prediction coding modes;
 (b) identifying and instantiating in memory a subset of unique MPM intra prediction coding modes from said set of unique intra prediction coding modes;
 (c) determining and instantiating in memory a subset of unique selected intra prediction coding modes from said set of unique intra prediction coding modes other than said subset of unique MPM intra prediction coding modes based on a prioritized manner that includes
  (1) addition and/or subtraction of an integer value from each of the unique MPM intra prediction coding modes;
  (2) after selection of coding modes from (1) selecting first additional modes from a set of a vertical mode, a horizontal mode, a diagonal angular mode, and a diagonal mode, all of which are not included as one of the unique MPM intra prediction coding modes;
  (3) after selection of coding modes from (2) selecting second additional modes from a set of modes based upon addition and/or subtraction of a second integer value from (a) the unique MPM intra prediction coding modes, (b) the vertical mode, (c) the horizontal mode, (d) the diagonal angular mode, and/or (e) the diagonal mode; and
 (d) identifying and instantiating in memory a subset of unique non-selected intra prediction coding modes from said set of unique intra prediction coding modes other than said subset of unique MPM intra prediction coding modes and other than said subset of unique selected intra prediction coding modes.

2. The method of prioritizing intra prediction coding modes for intra prediction coding of claim 1 wherein a value of said integer value is 1.

3. The method of prioritizing intra prediction coding modes for intra prediction coding of claim 1 wherein said unique non-selected intra prediction coding modes are determined based on addition and subtraction of an increasing integer value from each of the unique selected intra prediction coding modes.

4. The method of prioritizing intra prediction coding modes for intra prediction coding of claim 3 wherein an initial value of said increasing integer value is 1.

5. The method of prioritizing intra prediction coding modes for intra prediction coding of claim 1:
    wherein said subset of selected intra prediction coding modes is a subset of 16 intra prediction coding modes; and
    wherein an initial value of said integer value is 1.

6. The method of prioritizing intra prediction coding modes for intra prediction coding of claim 5, wherein said set of unique intra prediction coding modes is a set of 67 intra prediction coding modes.

7. The method of prioritizing intra prediction coding modes for intra prediction coding of claim 1, wherein said subset of MPM intra prediction coding modes is a subset of fewer than 6 MPM intra prediction coding modes.

8. The method of prioritizing intra prediction coding modes for intra prediction coding of claim 7:
    wherein said subset of selected intra prediction coding modes is a subset of 16 intra prediction coding modes; and
    wherein an initial value of said integer value is 1.

9. The method of prioritizing intra prediction coding modes for intra prediction coding of claim 8, wherein said set of unique intra prediction coding modes is a set of 67 intra prediction coding modes.

10. The method of prioritizing intra prediction coding modes for intra prediction coding of claim 1, wherein said set of unique intra prediction coding modes is a set of 67 intra prediction coding modes.

11. The method of prioritizing intra prediction coding modes for intra prediction coding of claim 10, wherein said subset of MPM intra prediction coding modes is a subset of 5 intra prediction coding modes.

12. The method of prioritizing intra prediction coding modes for intra prediction coding of claim 11, wherein said set of MPM intra prediction coding modes is encoded using truncated unary binarization coding.

13. The method of prioritizing intra prediction coding modes for intra prediction coding of claim 12, wherein said subset of selected intra prediction coding modes is a subset of 16 intra prediction coding modes.

14. The method of prioritizing intra prediction coding modes for intra prediction coding of claim 13, wherein said set of selected intra prediction coding modes is encoded using 4 bit fixed length coding.

15. A method that includes a non-transitory processor readable storage medium storing instructions that when executed by said processor, cause the system to perform prioritizing intra prediction coding modes for intra prediction coding comprising the steps of:
    (a) instantiating in memory a set of 67 unique intra prediction coding modes;
    (b) instantiating in memory a subset of unique MPM intra prediction coding modes from said set of unique intra prediction coding modes;
    (c) instantiating in memory a subset of 16 unique selected intra prediction coding modes from said set of unique intra prediction coding modes other than said subset of unique MPM intra prediction coding modes based on a prioritized manner that includes
        (1) addition and/or subtraction of an integer value from each of the unique MPM intra prediction coding modes;
        (2) after selection of coding modes from (1) selecting first additional modes from a set of a vertical mode, a horizontal mode, a diagonal angular mode, and a diagonal mode, all of which are not included as one of the unique MPM intra prediction coding modes;
        (3) after selection of coding modes from (2) selecting second additional modes from a set of modes based upon addition and/or subtraction of a second integer value from (a) the unique MPM intra prediction coding modes, (b) the vertical mode, (c) the horizontal mode, (d) the diagonal angular mode, and/or (e) the diagonal mode;
    (d) instantiating in memory a subset of unique non-selected intra prediction coding modes from said set of unique intra prediction coding modes other than said subset of unique MPM intra prediction coding modes and other than said subset of unique selected intra prediction coding modes;
    (e) encoding said subset of unique MPM intra prediction coding modes using truncated unary binarization; and
    (f) encoding said subset of 16 unique selected intra prediction coding modes using 4 bits of fixed length code.

16. The system of prioritizing intra prediction coding modes for intra prediction coding of claim 15, wherein said subset of unique MPM intra prediction coding modes contains 5 or fewer unique MPM intra prediction coding modes.

17. The system of prioritizing intra prediction coding modes for intra prediction coding of claim 15, wherein a value of said integer value is 1.

18. The system of prioritizing intra prediction coding modes for intra prediction of claim 15, wherein said subset of unique MPM intra prediction coding modes contains 5 unique MPM intra prediction coding modes.

19. The system of prioritizing intra prediction coding modes for intra prediction coding of claim 18 wherein a value of said integer value is 1.

20. The system of prioritizing intra prediction coding modes for intra prediction coding of claim 15 wherein said subset of unique MPM intra prediction coding modes contains more than 6 unique MPM intra prediction coding modes.

* * * * *